United States Patent
Weick

(10) Patent No.: US 7,859,752 B2
(45) Date of Patent: Dec. 28, 2010

(54) OPTICAL MODULE FOR ADJUSTING A LASER BEAM OF A LASER PROCESSING MACHINE

(75) Inventor: Juergen-Michael Weick, Asperg (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 494 days.

(21) Appl. No.: 11/927,279

(22) Filed: Oct. 29, 2007

(65) Prior Publication Data

US 2008/0088924 A1    Apr. 17, 2008

Related U.S. Application Data

(63) Continuation of application No. PCT/EP2006/003995, filed on Apr. 28, 2006.

(30) Foreign Application Priority Data

Apr. 29, 2005    (DE)    ........... 20 2005 006 838 U

(51) Int. Cl.
  *G02B 5/30*    (2006.01)
(52) U.S. Cl. ............ 359/497; 359/494; 359/846; 359/857; 219/121.6
(58) Field of Classification Search ........ None
See application file for complete search history.

(56) References Cited

U.S. PATENT DOCUMENTS

| | | | |
|---|---|---|---|
| 4,380,694 | A | 4/1983 | Dyson |
| 4,746,202 | A | 5/1988 | Perilloux et al. |
| 4,977,574 | A * | 12/1990 | Karube ............ 372/93 |
| 5,020,895 | A | 6/1991 | Giesen et al. |
| 7,102,806 | B2 | 9/2006 | Boettcher |
| 2002/0003131 | A1 | 1/2002 | Schluter |

FOREIGN PATENT DOCUMENTS

| | | |
|---|---|---|
| DE | 41 08 419 | 9/1992 |
| DE | 92 15 361 | 4/1994 |
| DE | 199 14 984 | 10/2000 |
| DE | 10128609 | 1/2003 |
| FR | 2786938 | 6/2000 |
| GB | 2 254 164 | 9/1992 |
| JP | 03128187 A * | 5/1991 |

OTHER PUBLICATIONS

International Search report from corresponding PCT application No. PCT/EP2006/003995 including the written opinion, 10 pages, mailed Aug. 25, 2006, including English translation of relevant portions, 4 pages.
Search report from related German application DE 20 2005 006 838.1, 4 pages, mailed May 10, 2005, including English translation of relevant portion, 1 page.
English Translation of Office Action from corresponding Chinese Application No. CN 2006800182982, mailed Mar. 20, 2009, 1 page.
English Translation of Office Action from corresponding Chinese Application No. CN 2006800182982, Dec. 4, 2009, 2 pages.

* cited by examiner

*Primary Examiner*—Arnel C Lavarias
(74) *Attorney, Agent, or Firm*—Fish & Richardson P.C.

(57) ABSTRACT

An optical module adjusts an output of a laser of a laser processing machine. The optical module consists essentially of includes an adaptive spherical mirror configured to receive a laser beam from the laser, and a spherical mirror configured to receive a laser beam reflected from the adaptive mirror. Both the adaptive mirror and the spherical mirror have a phase-shifting coating such that the laser beam reflected from the spherical mirror has a circular polarization.

15 Claims, 1 Drawing Sheet

OPTICAL MODULE FOR ADJUSTING A LASER BEAM OF A LASER PROCESSING MACHINE

CROSS REFERENCE TO RELATED APPLICATION

This application is a continuation of, and claims priority under 35 U.S.C. §120 to PCT/EP2006/003995, filed on Apr. 28, 2006, and designating the U.S., which claims priority from German Application No. 20 2005 006 838.1, filed Apr. 29, 2005. Both of these priority applications are hereby incorporated by reference in their entirety.

TECHNICAL FIELD

The description relates to adjustment of a laser beam of a laser processing machine.

BACKGROUND

Up to now, the laser beam emerging from the laser of a laser processing machine has been widened using curved output mirrors of the laser.

Circular polarization is used in laser processing, for example, for laser cutting of workpieces, and circular polarization is generally produced in laser processing machines.

SUMMARY

In one general aspect, an optical module adjusts an output of a laser of a laser processing machine. The optical module includes an adaptive mirror, and a spherical mirror. Both the adaptive mirror and the spherical mirror have a phase-shifting coating.

Implementations can include one or more of the following features. For example, the adaptive mirror can be configured to receive an input laser beam of the laser and the spherical mirror can be configured to receive a laser beam reflected from the adaptive mirror.

The adaptive mirror and the spherical mirror can be configured such that a laser beam input to the optical module is parallel with and offset from a laser beam output from the optical module.

The spherical mirror can be fixed within the optical module.

The adaptive mirror and the spherical mirror can be configured to generate, in combination, circularly polarized light. The adaptive mirror and the spherical mirror can be configured to adjust the laser beam width of a laser beam produced by the laser.

The adaptive mirror and the spherical mirror can be configured to produce a circular polarization of a laser beam produced by the laser.

Both the adaptive mirror and the spherical mirror can be configured to shape the beam of the laser.

The optical module can include only the adaptive mirror and the spherical mirror.

The adaptive mirror and the spherical mirror can each be configured to shape the laser beam from the laser and to alter the polarization of the laser beam from the laser such that the output beam from the optical module is circularly polarized and collimated.

In another general aspect, a laser beam is directed to a workpiece to be cut. The laser beam is expanded and the polarization of the laser beam is adjusted using only an adaptive mirror. A collimated and circularly polarized laser beam is produced using only a spherical mirror that receives a laser beam reflected from the adaptive mirror.

Implementations can include one or more of the following features. For example, the adaptive mirror and the spherical mirror can be configured such that the collimated and circularly polarized laser beam is parallel with and offset from the laser beam input to the adaptive mirror.

The spherical mirror can be fixed in position.

The adaptive mirror can receive the laser beam directly from an output of the laser.

The collimated and circularly polarized laser beam can be directed directly onto the workpiece.

In another general aspect, an optical module adjusts an output of a laser of a laser processing machine. The optical module includes an adaptive spherical mirror configured to receive a laser beam from the laser, and a spherical mirror configured to receive a laser beam reflected from the adaptive mirror. Both the adaptive mirror and the spherical mirror have a phase-shifting coating such that the laser beam reflected from the spherical mirror has a circular polarization.

Implementations can include one or more of the following features. For example, the adaptive spherical mirror and the spherical mirror can be configured such that a laser beam input to the optical module is parallel with and offset from a laser beam output from the optical module.

The spherical mirror can be fixed within the optical module.

The adaptive spherical mirror and the spherical mirror can each be configured to adjust the laser beam shape of a laser beam produced by the laser.

The adaptive spherical mirror and the spherical mirror can each be configured to shape the laser beam from the laser and to alter the polarization of the laser beam from the laser such that the output beam from the optical module is circularly polarized and collimated.

The optical module is configured to adjust a beam width (and therefore provides beam shaping) and to produce a circular polarization of the laser beam of the laser processing machine.

The optical module is mounted in the laser of a laser processing machine and it includes an adaptive mirror and a spherical mirror. Both mirrors have a phase-shifting coating. One advantage of such an arrangement is the modularity. The output mirror with varying radii, which is difficult to acquire, can remain planar, which reduces the variety of parts. The fixedly spherically curved mirrors can be designed in a few standard sizes, since the adaptive mirror enables fine adjustment of the beam diameter over a wide range.

The optical module provides one or more of the following advantages. The manufacture of the optical module is less expensive than previously designed systems for laser beam widening. Moreover, the optical module provides adjustment of the widening of the laser beam and the widening of the laser beam can be adjusted during operation of the laser processing machine. Adaptive adjustment of the mirrors within the optical module of the laser can be performed in series.

The optical module is designed as a single unit that provides both beam shaping and circular polarization of the laser beam of a laser processing machine; to enable a single unit design having only two mirrors, each mirror is configured to shape the laser beam and to adjust the polarization of the laser beam such that the output of the optical module is a collimated and circularly polarized laser beam ready to be used in laser processing applications such as laser cutting.

DETAILED DESCRIPTION

Figure 1:
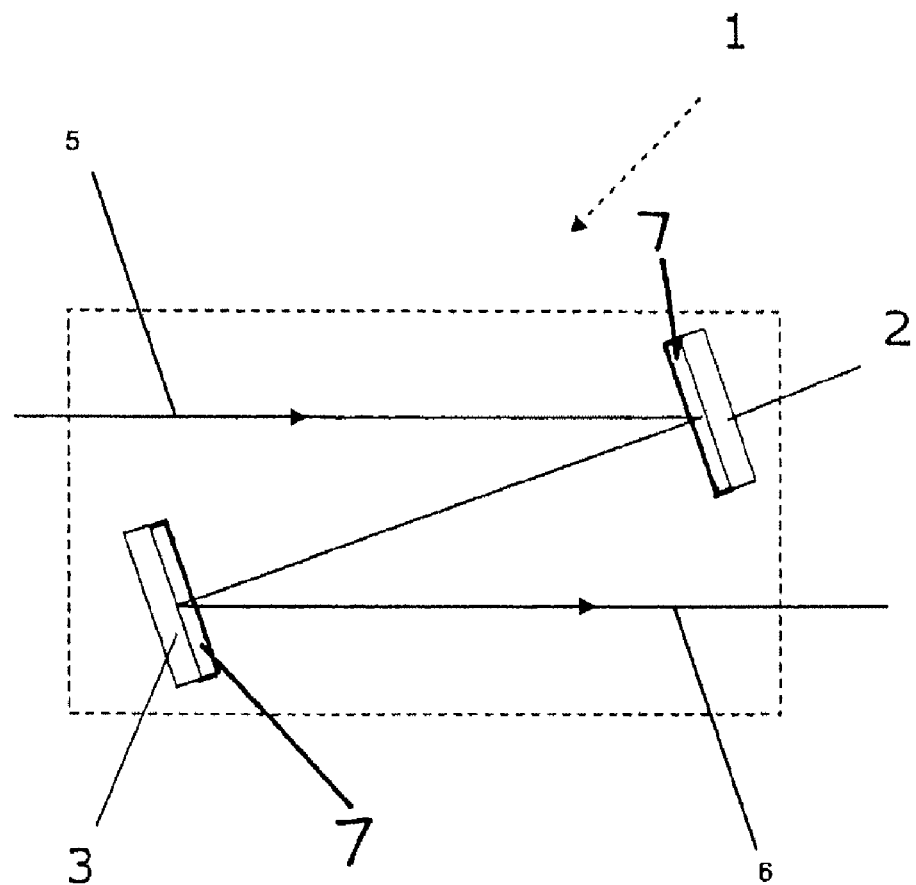
FIG. 1 is a block diagram of an optical module for installation in a laser processing machine.

Referring to FIG. 1, an optical module 1 is designed for integration below a laser cover of a laser processing machine that can be used, for example, for laser cutting of a workpiece and that can include not only the optical module 1 but also focusing optics to adjust the laser beam impinging upon the workpiece. Alternatively, the optical module 1 can be mounted along the path of the laser beam of another laser processing machine.

The optical module 1 creates a parallel offset of a laser beam in the y and z directions, where the laser beam is produced from a laser of the laser processing machine. The optical module 1 includes a first mirror that is in the path of an input laser beam 5 and a second mirror 3 that is in the path of the laser beam that is reflected from the first mirror 2 and produces an output laser beam 6 that is directed to focusing optics of the laser processing machine. The distance between the first mirror 2 and the second mirror 3 can be, for example, about 500 mm. The optical module 1 is installed near an output of the laser of the laser processing machine. The configuration of the mirrors 2, 3 causes the output beam 6 to be substantially parallel with the input beam 5. The y-z plane (which is the plane in which the mirrors are folded) is in the plane of the page.

The optical module 1 is provided for separations of greater than 3 m between the second mirror 3 of the module 1 and the focusing optics of the laser processing machine.

The first mirror 2 of the optical module 1 is an adaptive mirror that has an adjustment range of −10 m to +10 m. The adaptive mirror 2 can be spherical and can be pressure adjusted, as described, for example, in U.S. Pat. No. 5,020,895, which is incorporated herein by reference in its entirety. The adaptive mirror 2 expands the laser beam 5 and also adjusts the polarization of the laser beam 5. Thus, the adaptive mirror 2 provides for both adjustment of the beam shape and beam polarization.

The currently used raw beam diameters of the cutting lasers image a laser beam with an angle of deflection of 15° and with a high quality (that is, low astigmatism) using the adaptive mirror 2 without any problem. The adaptive mirror 2 has a coating 7 that provides a phase-shift, for example, through 45°, of the input laser beam 5. The position of the adaptive mirror 2 can be 850 mm behind an output mirror of the laser. The coating 7 of the adaptive mirror 2 can be, for example, thorium fluoride or ZnSe.

The second mirror 3 is a fixed spherical mirror that is designed in accordance with the laser processing machine conditions. The spherical mirror 3 images the laser beam at a distance from the focusing optics. In particular, the spherical mirror 3 is configured to produce a parallel (or collimated) output laser beam 6 from the expanded beam reflected from the adaptive mirror 2.

Additionally, the spherical mirror 3 also includes a coating 7 that produces a phase-shift, for example, a 45° phase shift. The spherical mirror 3 can provide such a phase-shift by adjusting the coating 7 (for example, by adjusting a thickness or a material of the coating) so that the angle of incidence can be as low as 15° (when compared with the conventional angle of incidence of 45°), and by configuring the plane of folding (the y-z plane) of the two mirrors 2 and 3 to be rotated relative to the polarization direction of the input laser beam 5 by, for example, 45°. An angle of incidence of 15° was determined as a lower limit for a 45° phase-shifting layer, which can be technically realized. Smaller angles could produce excessive absorption. The coating 7 of the spherical mirror 3 can be thorium fluoride or ZnSe.

The input beam 5 and the output beam 6 of the plane of folding (the y-z plane) within the optical module 1 are parallel to each other.

The optical module 1 is configured to adjust the width of the laser beam and to produce a circular polarization of the laser beam. Thus, the optical module 1 can not only shape the laser beam (by, for example, adjusting the expansion of the laser beam) but can also impart a rotating polarization vector to the laser beam to produce a circular (or elliptical) polarization. In this way, the optical module 1 provides a single unit that performs both beam shaping and produces circular polarization using only two mirrors that each perform beam shaping and alter the polarization.

The arrangement of the adaptive mirror 2 and the spherical mirror 3 enables for greater flexibility in the design. The spherical mirror 3 is fixed and can be designed in a few standard sizes for coarse adjustment of the laser beam diameter since the adaptive mirror 2 can be used for fine adjustment of the beam diameter over a wide range.

The adaptive mirror 2 can be adjusted either using a fixedly adjusted pressure reducer or in a flexible fashion with a proportional valve. The adaptive mirror 2 can be a pressure-sensitive deformable mirror, such as, for example, the adaptive mirror described in U.S. Pat. No. 7,102,806, which is incorporated herein by reference in its entirety.

OTHER IMPLEMENTATIONS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An optical module for adjusting an output of a laser of a laser processing machine, the optical module comprising:
an adaptive mirror, and
a spherical mirror,
wherein the adaptive mirror and the spherical mirror each have a coating that phase shifts an incident laser beam by 45°.

2. The optical module of claim 1, wherein the adaptive mirror is configured to receive a laser beam output by the laser and the spherical mirror is configured to receive a laser beam reflected from the adaptive mirror.

3. The optical module of claim 1, wherein the adaptive mirror and the spherical mirror are configured such that a laser beam input to the optical module is parallel with and offset from a laser beam output from the optical module.

4. The optical module of claim 1, wherein the spherical mirror is fixed within the optical module.

5. The optical module of claim 1, wherein the adaptive mirror and the spherical mirror are configured to generate in combination circularly polarized light.

6. The optical module of claim 1, wherein the adaptive mirror and the spherical mirror are configured to adjust a laser beam widening of a laser beam output by the laser during operation of the laser.

7. The optical module of claim 1, wherein the adaptive mirror and the spherical mirror are configured to produce a circular polarization of a laser beam output by the laser during operation of the laser.

8. The optical module of claim 1, wherein both the adaptive mirror and the spherical mirror are configured to shape a beam of the laser.

9. The optical module of claim 1, wherein the optical module comprises only the adaptive mirror and the spherical mirror.

10. The optical module of claim 1, wherein the adaptive mirror and the spherical mirror are each configured to shape a laser beam from the laser and to alter a polarization of the laser beam from the laser such that an output beam from the optical module is circularly polarized and collimated.

11. An optical module for adjusting an output of a laser of a laser processing machine, the optical module consisting essentially of:
an adaptive spherical mirror configured to receive a laser beam from the laser, and
a spherical mirror configured to receive a laser beam reflected from the adaptive mirror,
wherein the adaptive mirror and the spherical mirror each have a coating that phase shifts an incident laser beam by 45° such that a laser beam reflected from the spherical mirror has a circular polarization.

12. The optical module of claim 11, wherein the adaptive spherical mirror and the spherical mirror are configured such that a laser beam input to the optical module is parallel with and offset from a laser beam output from the optical module.

13. The optical module of claim 11, wherein the spherical mirror is fixed within the optical module.

14. The optical module of claim 11, wherein the adaptive spherical mirror and the spherical mirror are each configured to adjust a laser beam shape of the laser beam from the laser.

15. The optical module of claim 11, wherein the adaptive spherical mirror and the spherical mirror are each configured to shape the laser beam from the laser and to alter a polarization of the laser beam from the laser such that an output beam from the optical module is circularly polarized and collimated.

* * * * *

UNITED STATES PATENT AND TRADEMARK OFFICE
CERTIFICATE OF CORRECTION

PATENT NO. : 7,859,752 B2  Page 1 of 1
APPLICATION NO. : 11/927279
DATED : December 28, 2010
INVENTOR(S) : Juergen-Michael Weick It is certified that error appears in the above-identified patent and that said Letters Patent is hereby corrected as shown below:

On the title page item (57), in the Abstract, lines 2 and 3, delete "consists essentially of".

Signed and Sealed this
Twenty-fourth Day of May, 2011

David J. Kappos
*Director of the United States Patent and Trademark Office*